US008447335B2

(12) United States Patent
Agarwal

(10) Patent No.: US 8,447,335 B2
(45) Date of Patent: May 21, 2013

(54) METHODS, SYSTEMS, AND COMPUTER PROGRAM PRODUCTS FOR PROVIDING FIRST DELIVERY ATTEMPT SERVICE FOR SHORT MESSAGE PEER-TO-PEER (SMPP) MESSAGES

(75) Inventor: Devesh Agarwal, Raleigh, NC (US)

(73) Assignee: Tekelec Global, Inc., Morrisville, NC (US)

( * ) Notice: Subject to any disclaimer, the term of this patent is extended or adjusted under 35 U.S.C. 154(b) by 635 days.

(21) Appl. No.: 12/626,460

(22) Filed: Nov. 25, 2009

(65) Prior Publication Data

US 2010/0136981 A1 Jun. 3, 2010

Related U.S. Application Data

(60) Provisional application No. 61/117,940, filed on Nov. 25, 2008.

(51) Int. Cl.
*H04W 4/00* (2009.01)
(52) U.S. Cl.
USPC ............... 455/466; 455/414.1; 455/422.1; 455/412.1
(58) Field of Classification Search ............... 455/466, 455/414.1, 422.1, 412.1
See application file for complete search history.

(56) References Cited

U.S. PATENT DOCUMENTS

| | | |
|---|---|---|
| 6,463,055 B1 | 10/2002 | Lupien et al. |
| 6,560,456 B1 | 5/2003 | Lohtia et al. |
| 6,611,516 B1 | 8/2003 | Pirkola et al. |
| 6,731,926 B1 | 5/2004 | Link et al. |
| 6,738,636 B2 | 5/2004 | Lielbriedis |
| 6,795,701 B1 | 9/2004 | Baker et al. |
| 6,885,872 B2 | 4/2005 | McCann et al. |
| 7,079,524 B2 | 7/2006 | Bantukul et al. |
| 7,110,780 B2 | 9/2006 | Bantukul et al. |
| 7,221,952 B2 | 5/2007 | Cho et al. |
| 7,366,530 B2 | 4/2008 | McCann et al. |
| 2001/0041579 A1 | 11/2001 | Smith et al. |
| 2002/0019243 A1 | 2/2002 | Zhang et al. |

(Continued)

FOREIGN PATENT DOCUMENTS

| | | |
|---|---|---|
| WO | WO 03/069924 A2 | 8/2003 |
| WO | WO 2004/102345 A2 | 11/2004 |
| WO | WO 2005/077014 A2 | 8/2005 |
| WO | WO 2010/068506 A2 | 6/2010 |

OTHER PUBLICATIONS

Communication purusuant to Article 94(3) EPC for European application No. 04751843.6 (Dec. 15, 2011).

(Continued)

*Primary Examiner* — Nghi H Ly
(74) *Attorney, Agent, or Firm* — Jenkins, Wilson, Taylor & Hunt, P.A.

(57) ABSTRACT

Methods, systems, and computer readable media for providing a first delivery attempt (FDA) for short message peer-to-peer messages are disclosed. One method includes receiving, in a first network, a short message peer-to-peer protocol (SMPP) message from second communications network external to the first communications network. The SMPP message is converted into a mobile originated SMS message. The method also includes forwarding the mobile originated SMS message to a first delivery attempt (FDA) device, wherein the FDA device converts the mobile originated SMS message into a mobile terminated SMS message. The mobile terminated SMS message is delivered to a device in the local communications network.

25 Claims, 4 Drawing Sheets

U.S. PATENT DOCUMENTS

| | | | |
|---|---|---|---|
| 2002/0173320 | A1 | 11/2002 | Aitken et al. |
| 2003/0003932 | A1 | 1/2003 | Corrigan et al. |
| 2003/0026289 | A1 | 2/2003 | Mukherjee et al. |
| 2003/0054844 | A1 | 3/2003 | Anvekar et al. |
| 2003/0109271 | A1 | 6/2003 | Lewis et al. |
| 2003/0193967 | A1 | 10/2003 | Fenton et al. |
| 2003/0199282 | A1 | 10/2003 | Marcjan et al. |
| 2003/0211856 | A1 | 11/2003 | Zilliacus |
| 2004/0087300 | A1 | 5/2004 | Lewis |
| 2004/0142707 | A1 | 7/2004 | Midkiff et al. |
| 2004/0198351 | A1 | 10/2004 | Knotts |
| 2004/0259531 | A1 | 12/2004 | Wood et al. |
| 2005/0070314 | A1 | 3/2005 | Wilson |
| 2005/0078660 | A1* | 4/2005 | Wood .......................... 370/352 |
| 2005/0119015 | A1 | 6/2005 | Linkola |
| 2006/0084451 | A1 | 4/2006 | Garnero et al. |
| 2006/0242230 | A1* | 10/2006 | Smith et al. .................. 709/203 |
| 2007/0178919 | A1* | 8/2007 | Huggett et al. ............... 455/466 |
| 2008/0064421 | A1 | 3/2008 | Philbin |
| 2009/0083763 | A1* | 3/2009 | Sareen et al. ................. 719/317 |
| 2010/0009701 | A1* | 1/2010 | Cai et al. ..................... 455/466 |

OTHER PUBLICATIONS

"ETSI EN 301 716 V7.3.1; Digital cellular telecommunications system (Phase 2+); Support of Mobile Number Portability (MNP); Technical Realisation; Stage 2 (GSM 03.66 Version 7.3.1. Release 1998)", ETSI EN 301 716 V7.3.1, XX, XX, pp. 1-71, XP002237024 (Oct. 1, 2000).

Communication purusuant to Article 94(3) EPC for European application No. 05713075.9 (Mar. 9, 2011).

Notification of Transmittal of the International Search Report and the Written Opinion of the International Searching Authority, or the Declaration for International Application No. PCT/US2009/065971 (Jul. 1, 2010).

Supplemental Notice of Allowability for U.S. Appl. No. 11/112,126 (Mar. 28, 2008).

Notice of Allowance and Fee(s) Due for U.S. Appl. No. 11/112,126 (Dec. 17, 2007).

Official Action for U.S. Appl. No. 11/112,126 (Jun. 15, 2007).

notice of Allowance and Fee(s) Due for U.S. Appl. No. 11/052,440 (Nov. 2, 2005).

Notification of Transmittal of the International Search Report and the Written Opinion of the International Searching Authority, of the Declaration in International Application No. PCT/US05/03901 (Sep. 20, 2005).

Notice of Allowance and Fee(s) Due for U.S. Appl. No. 11/052,440 (Jun. 9, 2005).

Supplemental Notice of Allowability for U.S. Appl. No. 10/842,394 (Feb. 9, 2005).

Notification of Transmittal of the International Search Report or the Declaration for International Application No. PCT/US04/14645 (Dec. 16, 2004).

Notice of Allowance and Fee(s) Due for U.S. Appl. No. 10/842,394 (Dec. 15, 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateye for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," Packet, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copywritten 2004).

"Cisco Signaling Gateway Manager Release 3.2 for Cisco IP Transfer Point," Cisco Systems, Inc., pp. 1-9 (Copywritten 1992-2004).

"Solutions for Mobile Network Operators," Cisco Systems, Inc., pp. 1-8 (Copywritten 1992-2004).

Moodie, "Agilent acceSS7: White Paper," Agilent Technologies, pp. 1-14 (Apr. 1, 2003).

Foster et al., "Number Portability in the Global Switched Telephone Network (GSTN): An Overview," Network Working Group, RFC 3482 (Feb. 2003).

"Short Message Peer-to-Peer Protocol Specification," www.smsforum.net, Version 5.0, pp. 1-166 (Feb. 2003).

"Cisco IP Transfer Point," Cisco Systems, Inc., pp. 1-10 (Copywritten 1992-2003).

"Cisco IP Transfer Point Multilayer Short Message Service Routing Solution," Cisco Systems, Inc., pp. 1-6 (Copywritten 1992-2003).

"Cisco ITP MAP Gateway for Public WLAN SIM Authentication and Authorization," Cisco Systems, Inc., pp. 1-13 (Copywritten 1992-2003).

Barry, "A Signal for Savings," Packet, Cisco Systems Users Magazine, vol. 14, No. 4, pp. Cover; 19-21; and 81 (Fourth Quarter 2002).

"Agilent Technologies and Cisco Systems SS7 over IP White Paper," Cisco Systems, Inc. and Agilent Technologies, pp. 1-6 (Copywritten 2002—Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copywritten 2002).

"Cisco SS7 Port Adapter for the Cisco 7500 Versatile Interface Processor and 7200 VXR Routers Provide High-Density SS7 Aggregation," Cisco Systems, Inc., pp. 1-5 (Copywritten 1992-2002).

"Next-Generation SS7 Networks with the Cisco IP Transfer Point," Cisco Systems, Inc., pp. 1-14 (Copywritten 1992-2002).

Sprague et al., "Tekelec's Transport Adapter Layer Interface," Network Working Group, RFC 3094 (Apr. 2001).

"Agilent acceSS7 Business Intelligence," Agilent Technologies, pp. 1-6 (Copyright 2001—Printed in the UK Nov. 30, 2001).

"Networkers," Cisco Systems, Inc., pp. 1-60 (Copywritten 2001).

"Cisco IP Transfer Point (ITP) Network Management Product Presentation," Cisco Systems, Inc., pp. 1-20 (Copyright 2001).

"Cisco SS7 Signaling Offload," Cisco Systems, Inc., pp. 1-33 (Copywritten 1992-2001).

"Eagle STP Platform," Tekelec, Publication 908-0126-01, Rev. A, pp. 1-4 (Copyright 1997).

"Topsail Beach—SS7 Over IP—" Cisco Systems, Inc., pp. 1-16.

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4) MB12, pp. 31-50 (Publication Date Unknown).

"Configuring ITP Optional Features," IP Transfer Point, Cisco IOS Release 12.2(4) MB12, pp. 65-136 (Publication Date Unknown).

"Configuring M3UA and SUA SS7 Over IP Signaling Gateways," IP Transfer Point, Cisco IOS Release 12.2(4) MB13, pp. 51-66 (Publication Date Unknown).

"Configuring M3UA and SUA SS7 Over IP Signaling Gateways," IP Transfer Point, Cisco IOS Release 12.2(4) MB10, pp. 49-62 (Publication Date Unknown).

* cited by examiner

METHODS, SYSTEMS, AND COMPUTER PROGRAM PRODUCTS FOR PROVIDING FIRST DELIVERY ATTEMPT SERVICE FOR SHORT MESSAGE PEER-TO-PEER (SMPP) MESSAGES

PRIORITY CLAIM

This application claims the benefit of U.S. Provisional Patent Application Ser. No. 61/117,940, filed Nov. 25, 2008; the disclosure of which is incorporated herein by reference in its entirety.

TECHNICAL FIELD

The subject matter described herein relates to providing first delivery attempt (FDA) services for short message service (SMS) messages originating from an external communications network. More specifically, the subject matter relates to methods, systems, and computer readable media for providing first delivery attempt service for short message peer-to-peer (SMPP) messages.

BACKGROUND

A mobile communication network is presently able to send SMS messages to and receive SMS messages from a plurality of different external communication networks. The communication of SMS messages between different mobile communications networks is made possible by utilizing the short message peer-to-peer protocol (SMPP) and SMPP gateway(s). However, due to the proliferation of SMS message use in communication networks, short message service centers (SMSCs) that exist in these networks frequently become overloaded. An SMSC is responsible for storing and forwarding SMS messages, conducting a prepaid/post paid analysis of the sender and/or recipient, generating queries of the home location register (HLR) to determine the mobile service center (MSC) serving the recipient party, and delivering SMS messages from external networks, for example as mobile terminated forward SM (MT_Forward_SM) messages. As an ever increasing number of subscribers begins to use SMS communications, the load on these SMSCs similarly increases.

To reduce the growing SMSC workload, some networks have tried to employ a first delivery attempt (FDA) service to alleviate a portion of the SMS traffic that is originated within the local network. FDA service involves delivering SMS messages to destinations without providing store and forward services where the message is stored until the destination is available and then delivered. FDA service can be implemented for SMS messages transmitted to or from machine destinations. For example, FDA service may be provided for SMS messages sent to voting applications or SMS messages transmitted from ad servers. Existing FDA services in telecommunication networks are configured (i.e., with software and hardware architectures) to process mobile originated forward short message (MO_Forward_SM or MO_FSM) messages that are generated by local MSCs that receive SMS messages from local network subscribers and to attempt to deliver those messages immediately without store and forward service.

In some networks, the FDA service is normally conducted by a server that is configured to receive and process mobile originated SMS (MO_SMS) messages. For each received MO_SMS message, the server normally accesses an HLR to determine if the intended recipient is a subscriber in the local network. If so, the server delivers the SMS message to the intended recipient without sending the message to the SMSC. By delivering the SMS messages to local recipients using FDA, the local SMSC is not accessed, and thus the SMSC workload is decreased. However, due to certain differences that exist in signaling protocols (e.g., SMPP vs. SS7), only mobile originated SMS messages are capable of having the FDA service applied. This network limitation poses problems because a considerable number of SMS messages processed within a local network are generated by external networks and are not mobile originated SMS messages. Therefore, SMS messages (e.g., contained in SMPP messages) received from external networks to be delivered to subscribers in the local network present a significant burden to the local network's SMSC.

Accordingly, a need exists for improved methods, systems, and computer readable media for providing a first delivery attempt for SMPP messages.

SUMMARY

Methods, systems, and computer readable media for providing a first delivery attempt (FDA) for short message peer-to-peer messages are disclosed. One method includes receiving, in a first network, a short message peer-to-peer protocol (SMPP) message from second communications network external to the first communications network. The SMPP message is converted into a mobile originated SMS message. The method also includes forwarding the mobile originated SMS message to a first delivery attempt (FDA) device, wherein the FDA device converts the mobile originated SMS message into a mobile terminated SMS message. The mobile terminated SMS message is delivered to a device in the local communications network.

The subject matter described herein for providing first delivery attempt service for short message peer-to-peer messages may be implemented in hardware, software, firmware, or any combination thereof. As such, the terms "function" or "module" as used herein refer to hardware, software, and/or firmware for implementing the feature being described.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods for providing a first delivery attempt (FDA) for short message peer-to-peer messages described herein. In addition, a computer readable medium that implements the subject matter described herein may be located on a single device or computing platform or may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
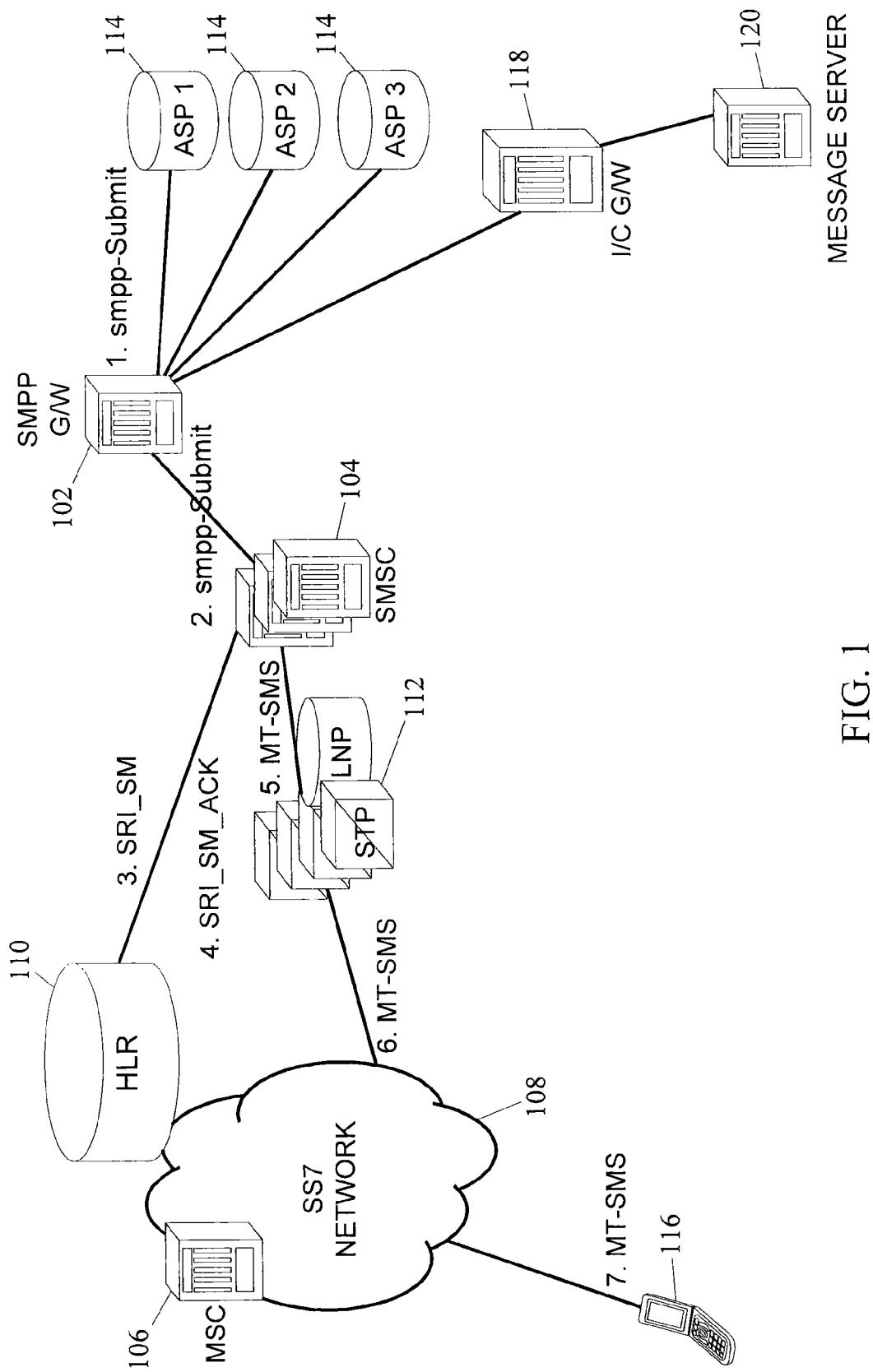
FIG. 1 is a network diagram of a short message peer-to-peer protocol (SMPP) originated message path delivery.

FIG. 1 depicts a network diagram illustrating short message peer-to-peer protocol (SMPP) message path without first delivery attempt service. Referring to FIG. 1, an SMPP gateway node 102 receives an SMPP message, which includes an SMS message, from an application server 114 or other network element in an external network (e.g., interconnect (I/C) gateway 118 and message server 120). SMPP gateway node 102 responds by generating an SMPP submit-SM message that is forwarded to a short message service center (SMSC) 104. In order to deliver the associated SMS message to the proper receiving endpoint device (e.g., mobile device 116), SMSC 104 sends an SRI_SM message to a network home location register (HLR) 110. In response, HLR 110 sends an SRI_SM acknowledgement message that contains mobile service center (MSC) information, such as the "B number" of the MSC serving the recipient mobile device 116. SMSC 104 then generates a mobile terminated SMS (MT-SMS) message, which is sent over the SS7 network to the serving MSC (e.g., MSC 106). As the MT-SMS message traverses the SS7 network, the message may be routed by one or more signal transfer points (STPs) 112. In the illustrated example, an STP routes the MT-SMS message to MSC 106 serving the intended mobile device 116.

Figure 2:
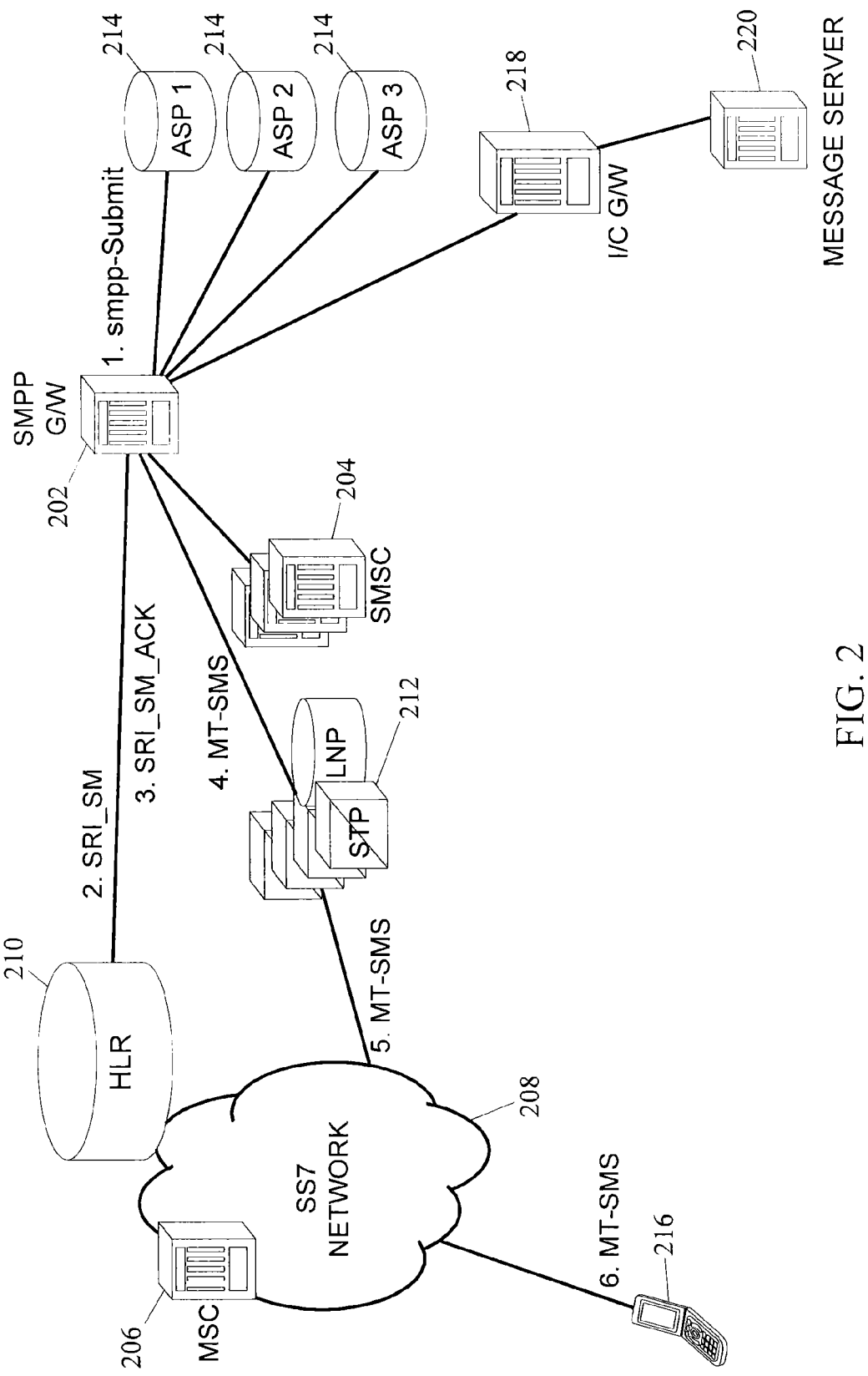
FIG. 2 is a network diagram of a SMPP originated message delivery path where the SMPP gateway performs prepaid/postpaid analysis.

FIG. 2 depicts a network diagram of an SMPP FDA path solution. Namely, an SMPP gateway 202 performs most of the processing and delivery tasks conducted by the SMSC shown in FIG. 1. SMPP gateway node 202 initially receives an SMPP message, which includes an SMS message, from an application server 214 or some other network element located in a foreign network. SMPP gateway node 202 responds by generating an SMPP submit-SM message. Instead of forwarding the submit-SM message to an SMSC 204, SMPP gateway node 202 functions as a first delivery attempt service. Namely, SMPP gateway node 202 generates and sends an SRI_SM message to HLR 210 in order to determine the proper receiving endpoint device (e.g., mobile device 216) to deliver the SMS message. In response, HLR 210 sends an SRI_SM acknowledgement message that contains mobile service center information, such as the "B number" of the MSC (e.g., MSC 206) serving the recipient endpoint device (e.g., mobile phone device 216). SMPP gateway node 202 then generates a mobile terminated SMS (MT-SMS) message, which is sent over the SS7 network to MSC 206. As the MT-SMS message traverses the SS7 network, the message may be routed by one or more STPs 212 and is delivered to MSC 206 serving mobile device 216. Notably, in this scenario, the SMPP gateway node 202 processes the SMS message and performs an FDA before SMSC 204 conducts any processing.

Figure 3:
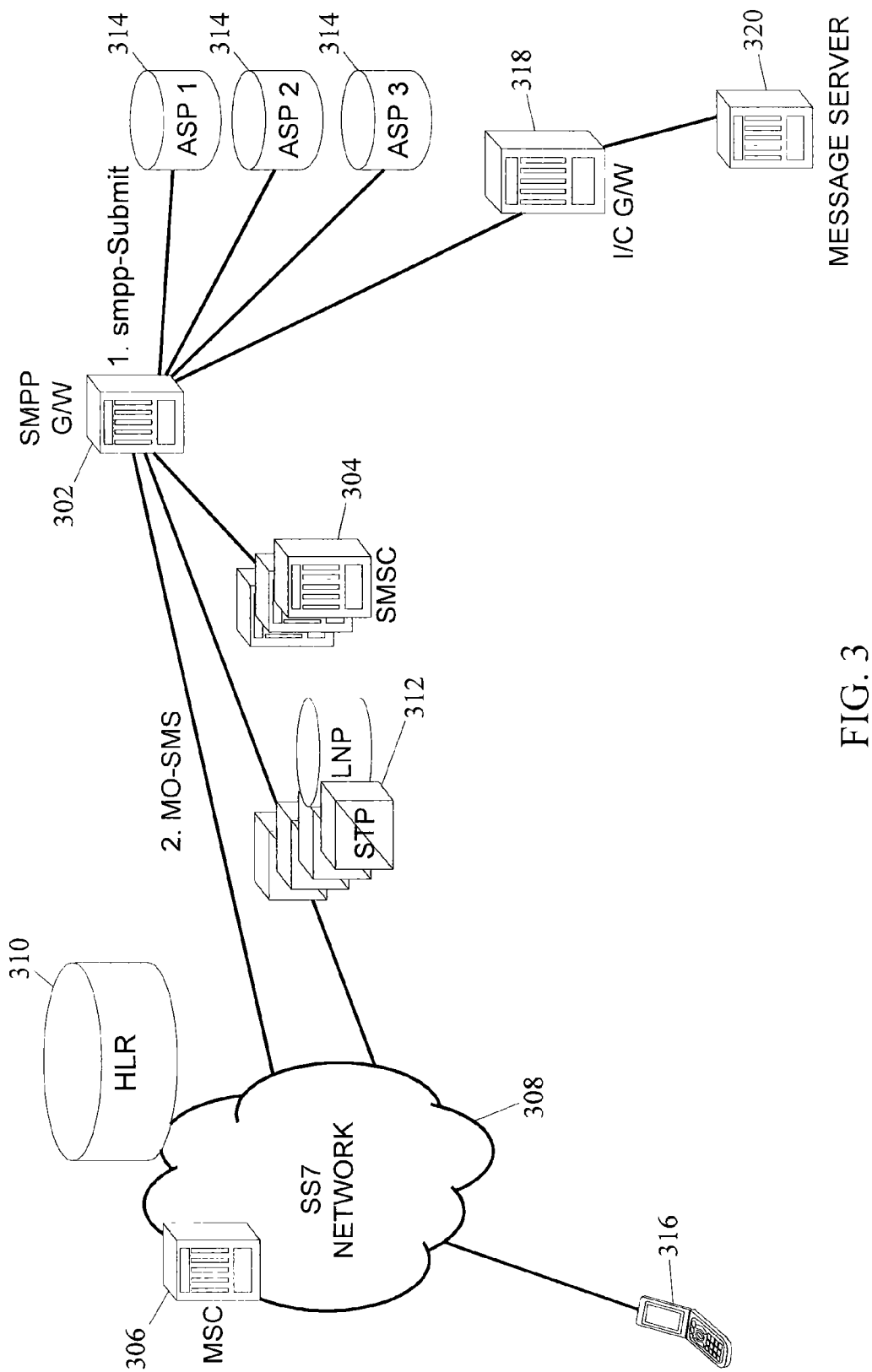
FIG. 3 is a network structured to apply a first delivery attempt (FDA) solution via an SMPP gateway that converts SMPP messages according to an embodiment of the subject matter described herein.

FIG. 3 depicts a network diagram of an SMPP originated first delivery attempt path solution in accordance to one embodiment of the present subject matter. An SMPP gateway node 302 initially receives an SMPP submit-SM message from an application server 314 or other network element in an external network. SMPP gateway node 302 then converts the SMPP submit message into a mobile originated (MO) Forward_SM message and forwards the message to or towards an STP 312 associated with the SS7 network. The MO_Forward_SM message is received at STP 312 for routing and/or processing. The MO_Forward_SM message may be MTP-routed or GTT-routed. Once the original SMS message has been converted to a MO_Forward_SM message, an existing FDA device or network element may be utilized. More specifically, the network's existing software logic and hardware for processing MO_SMS messages may be used to process the converted foreign SMPP messages. Thus, the workload of SMSC 304 is reduced.

Figure 4:
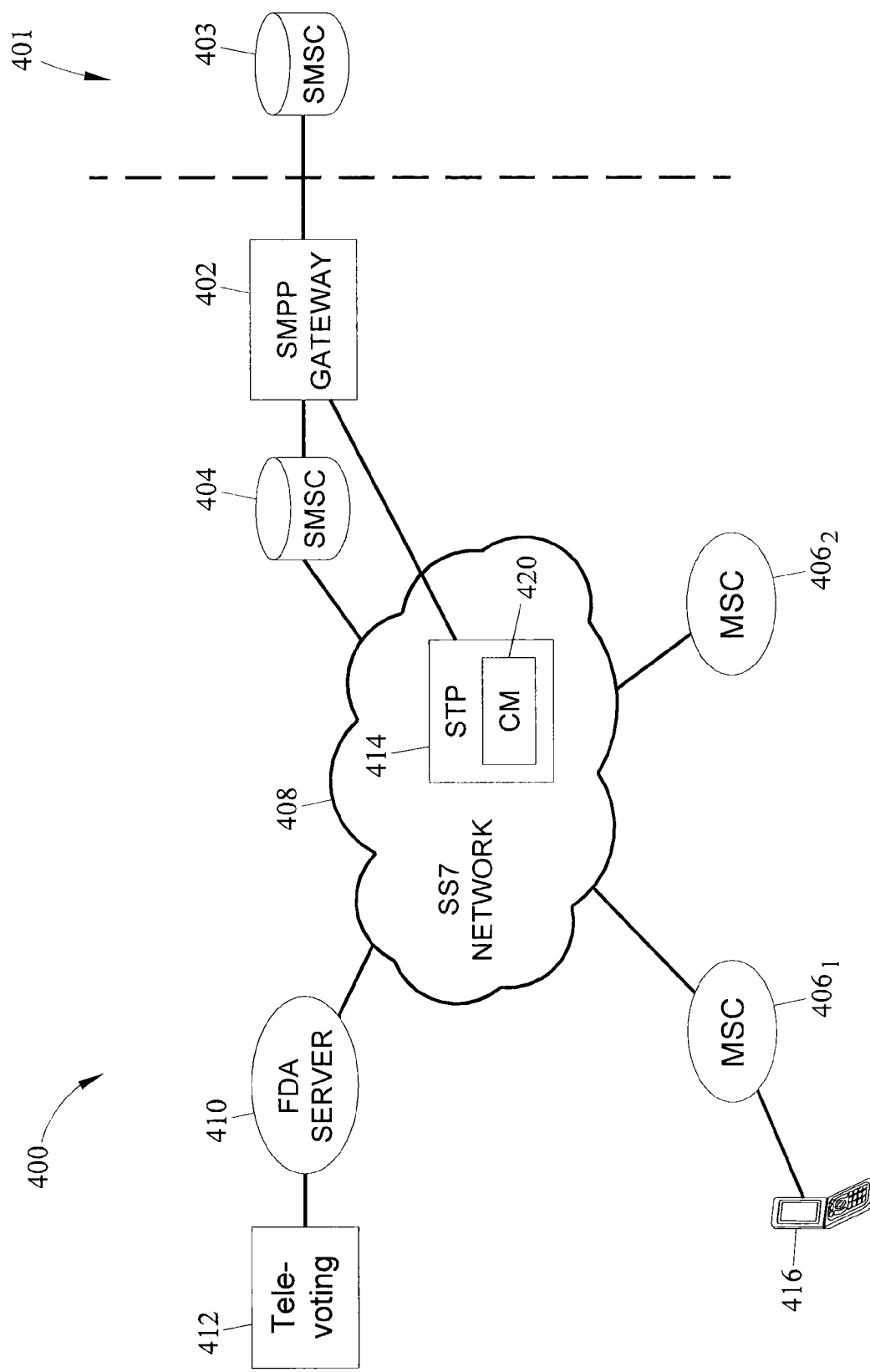
FIG. 4 is a network structured to apply a first delivery attempt (FDA) solution via a signal transfer point (STP) that converts SMPP messages according to an embodiment of the subject matter described herein.

FIG. 4 depicts a network for providing FDA services to SMPP messages (which include SMS messages) originating from an external network. In one embodiment, an SMPP submit-SM message originating from an external network (e.g., a message from a mobile device or software application in network 401) is received at SMPP gateway 402. In one embodiment, SMPP gateway 402 forwards the SMPP message, which contains the SMS message, to an STP 414. Instead of converting the message into an MT_SMS message, STP 414 converts the SMPP message into a mobile originated (MO) SMS message (e.g., a MO_Forward_ShortMessage). After the conversion process is conducted, the MO_SMS message is routed. In one embodiment, the MO_SMS message may either be MTP-routed or GTT-routed. For example, when the SMPP message is received at a conversion module 420 integrated in STP 414 (or alternatively, a standalone conversion module/device outside the STP), conversion module 420 may send an acknowledgement message to SMPP gateway 402, which in turn notifies the sending network that the original SMS message was received. Conversion module 420 may then generate the MO_SMS message in addition to starting a timer (e.g., a time limit) in order to record the amount of time that transpires before an acknowledgement of the notification message is received. In one embodiment, conversion module 420 in STP 414 may be adapted to perform the functions typically handled by an MSC (when an SMS message is received from a mobile device subscribed to local network 400). The converted MO_SMS message is then delivered to a FDA server 410 or other network element configured for providing FDA services. FDA server 410 is typically adapted to process MO_SMS messages that originate within network 400. However, because the original SMS message from external network 401 has been converted into an MO_SMS message by STP 414 (or SMSC 404), tech media server 410 may process the converted MO_SMS message normally since the message is in the proper format. If there is no FDA service or FDA server 410, then the message is delivered to SMSC 404.

In order to convert SMPP messages into mobile originated messages that the FDA server 410 can utilize, STP 414 (or SMSC 404) has default SS7 parameters that STP 414 inserts in the mobile originated SMS message. For example, conversion module 420 in STP 414 may include default parameters which allow conversion module 420 to function as an SS7 SMSC node that is separate from host STP 414. Thus, conversion module 420 is able to generate a mobile originated SMS message and receive an acknowledgement to the mobile originated SMS message, independent of STP 414. The SMPP message initially received by STP 414 includes the information needed to generate a converted mobile originated SMS message, such as the originator of SMS (e.g., the entity identified by the A party identifier), the recipient of SMS message (e.g., the entity identified by the B party identifier), and the content to be delivered (e.g., the SMS text). Conversion module 420 may convert this information contained in the SMPP message into an SS7 mobile originated SMS message, such as a GSM mobile originated forward short message message or the corresponding IS-41 message, that includes the same information. In one embodiment, the SMPP message information may be mapped to a short message service delivery point-to-point (SMDPP) message if the local network utilizes an IS-41 protocol.

In yet another embodiment, an STP may be configured to perform additional tasks such as conducting a prepaid/postpaid analysis, querying an HLR, and the like. For example, an SMS screening module associated with STP 414 may check the calling party and called party identifiers (i.e., A and B party identifiers) in the SMS message to determine if either party has a prepaid or postpaid SMS subscription. If either the A or B party identifier is a prepaid subscriber, then the short message is forwarded to SMSC 404. Namely, SMSC 404 is already equipped to perform the necessary prepaid account balance queries. If neither the A nor B party identifiers are associated with prepaid subscribers, then the SMS message is forwarded to a FDA processor or device. In an alternate embodiment, SMSC 404 only receives the short message if the B party identifier is a prepaid subscriber (i.e., the A-party status is immaterial). In yet another alternate embodiment, STP 414 may also screen the A and/or B party identifiers to determine if further message delivery processing is necessary. For example, STP 414 may screen the short message in a similar manner to determine if the B party has a zero balance, and if so then the message is not forwarded to the FDA server for delivery. STP 414 may screen the short message to determine if the A or B party has had their service suspended or blacklisted. If so, then the message is not forwarded to the FDA server for delivery.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing short message service (SMS) messages in a local communications network, the method comprising:
    receiving, in a first communications network, a short message peer-to-peer protocol (SMPP) message from a second communications network external to the first communications network;
    converting the SMPP message into a mobile originated SMS message, wherein converting the SMPP message into a mobile originated SMS message includes converting the SMPP message into one of a mobile originated forward short message message and a short message service delivery point to point message;
    forwarding the mobile originated SMS message to a first delivery attempt (FDA) device, wherein the FDA device converts the mobile originated SMS message into a mobile terminated SMS message; and
    delivering, by the FDA device, the mobile terminated SMS message to a device in the first communications network.

2. The method of claim 1, wherein the SMPP message comprises an SMPP Submit_SM message.

3. The method of claim 1, wherein converting the SMPP message into a mobile originated SMS message comprises converting the SMPP message into a mobile originated forward short message (MO_FSM) message.

4. The method of claim 1, wherein the mobile terminated SMS message comprises a mobile terminated forward short message (MT_FSM) message.

5. The method of claim 1 wherein converting the SMPP message into a mobile originated SMS message comprises converting the SMPP message into an IS-41 short message delivery point-to-point (SMDPP) message.

6. The method of claim 1, wherein the FDA device is located within a signal transfer point (STP).

7. The method of claim 1 wherein the FDA device is configured to receive and process mobile originated SMS messages.

8. The method of claim 1 wherein the FDA device comprises a server.

9. A computer readable medium having stored thereon computer executable instructions that when executed by a processor of a computer control the computer to perform steps comprising:
    receiving, in a first communications network, a short message peer-to-peer protocol (SMPP) message originating from a second communications network external to the first communications network;
    converting the SMPP message into a mobile originated short message service message, wherein converting the SMPP message into a mobile originated SMS message includes converting the SMPP message into one of a mobile originated forward short message message and a short message service delivery point to point message;
    forwarding the mobile originated SMS message to a first delivery attempt (FDA) device, wherein the FDA device converts the mobile originated SMS message into a mobile terminated short message service message; and
    delivering, by the FDA device, the mobile terminated SMS message to a device in the first communications network.

10. The computer readable medium of claim 9, wherein the SMPP message comprises an SMPP Submit_SM message.

11. The method of claim 9 wherein converting the SMPP message into a mobile originated SMS message comprises converting the SMPP message into an IS-41 short message delivery point-to-point (SMDPP) message.

12. The computer readable medium of claim 9, wherein converting the SMPP message into a mobile originated SMS message comprises converting the SMPP message into a mobile originated forward short message (MO_FSM) message.

13. The computer readable medium of claim 9, wherein the Mobile terminated SMS message includes a mobile terminated forward short message (MT_FSM) message.

14. The computer readable medium of claim 9, wherein the FDA device is located within a signal transfer point (STP).

15. The computer readable medium of claim 9 wherein the FDA device is configured to receive and process mobile originated SMS messages.

16. The computer readable medium of claim 9 wherein the FDA device comprises a server.

17. A system for providing first delivery attempt service for short message peer to peer (SMPP) messages, the system comprising:
    a short message peer-to-peer protocol (SMPP) gateway for receiving, in a first communications network, an SMPP message from a second communications network external to the first communications network, and for converting the SMPP message into a mobile originated short message service message, wherein converting the SMPP message into a mobile originated SMS message includes converting the SMPP message into one of a mobile originated forward short message message and a short message service delivery point to point message; and a first delivery attempt (FDA) device for receiving the mobile originated SMS message from the SMPP gateway, for converting the mobile originated SMS message into a mobile terminated SMS message, and for delivering the mobile terminated SMS message to a device in the first communications network.

18. The system of claim 17, wherein the SMPP message comprises an SMPP Submit_SM message.

19. The system of claim 17 wherein converting the SMPP message into a mobile originated SMS message comprises converting the SMPP message into an IS-41 short message delivery point-to-point (SMDPP) message.

20. The system of claim 17, wherein converting the SMPP message into a mobile originated SMS message comprises converting the SMPP message into a mobile originated forward short message (MO_FSM) message.

21. The system of claim 17, wherein the mobile terminated SMS message comprises a mobile terminated forward short message (MT_FSM) message.

22. The system of claim 17, wherein the FDA device is located within a signal transfer point (STP).

23. The system of claim 17 wherein the FDA device is configured to receive and process mobile originated SMS messages.

24. The system of claim 17 wherein the FDA device comprises a server.

25. The system of claim 17 wherein the FDA device is further configured to access a home location register (HLR) in the first network to determine the intended recipient of the mobile terminated SMS message.

* * * * *